Nov. 27, 1934.  A. E. LARSEN  1,982,113
MOUNTING MEANS FOR AIRCRAFT SUSTAINING ROTORS
Filed April 13, 1931  6 Sheets-Sheet 2
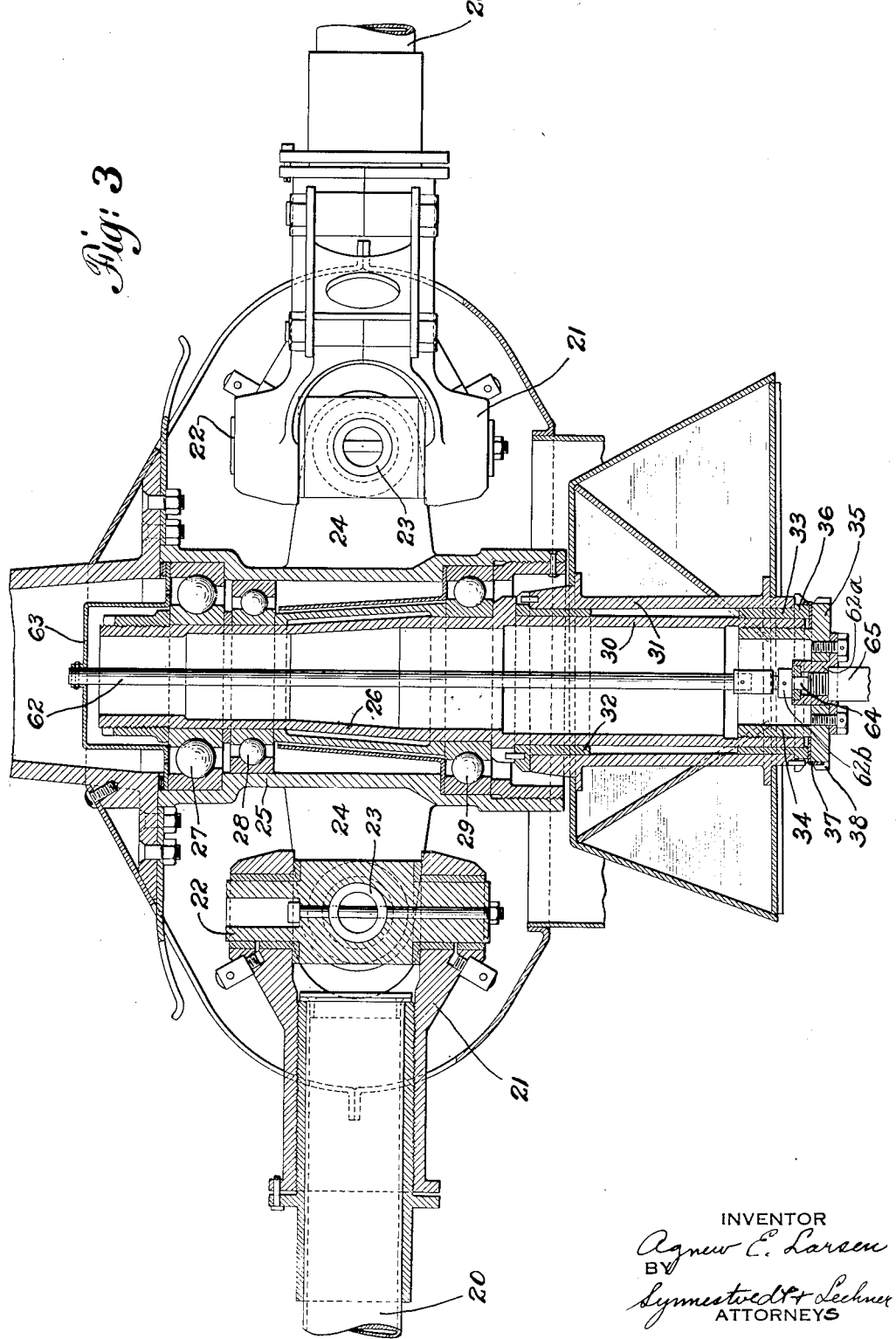
INVENTOR
Agnew E. Larsen
BY
Synnestvedt & Lechner
ATTORNEYS Nov. 27, 1934.  A. E. LARSEN  1,982,113
MOUNTING MEANS FOR AIRCRAFT SUSTAINING ROTORS
Filed April 13, 1931   6 Sheets-Sheet 3

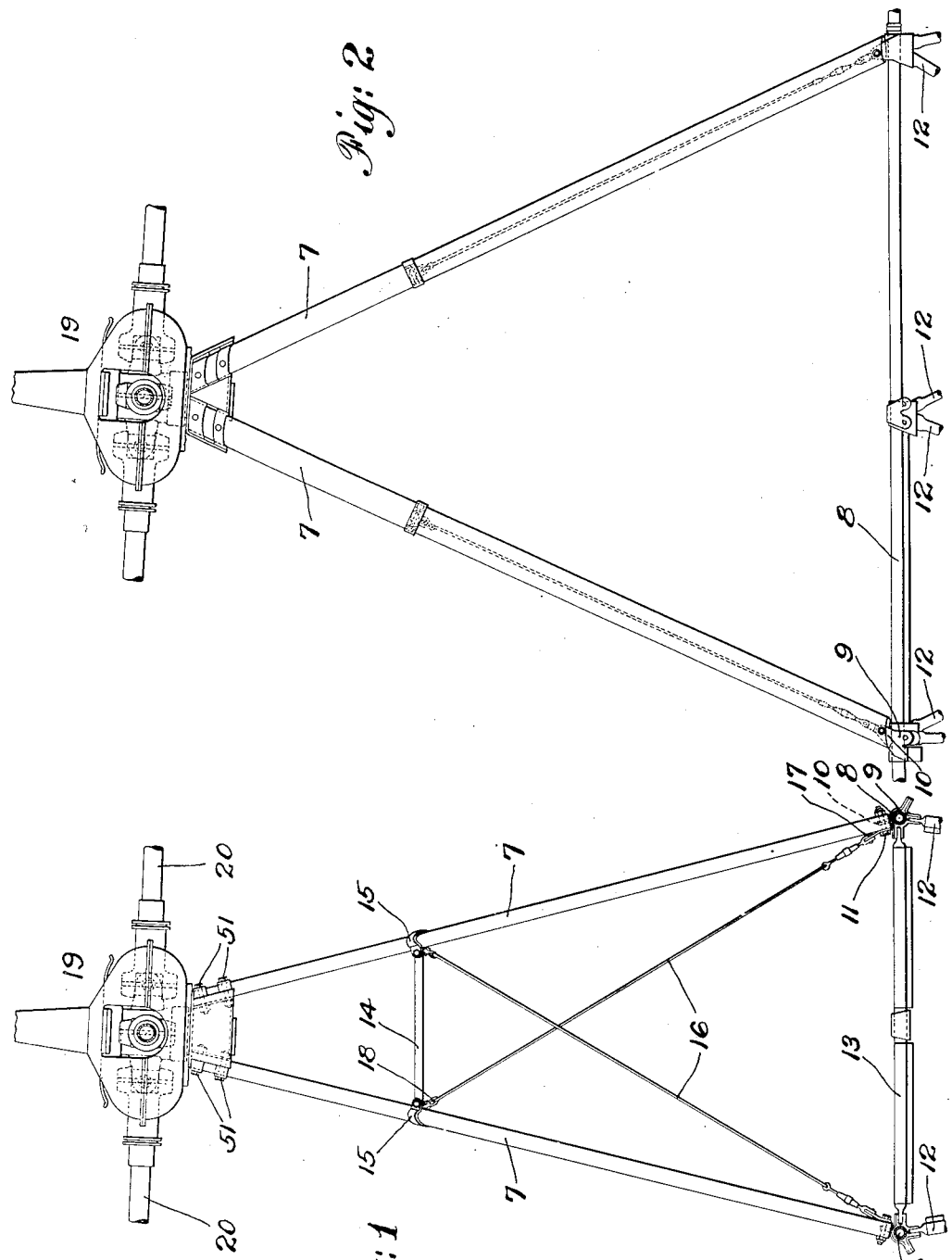

INVENTOR
Agnew E. Larsen
BY
Symestuedt + Lechner
ATTORNEYS

Nov. 27, 1934. A. E. LARSEN 1,982,113
MOUNTING MEANS FOR AIRCRAFT SUSTAINING ROTORS
Filed April 13, 1931 6 Sheets-Sheet 4
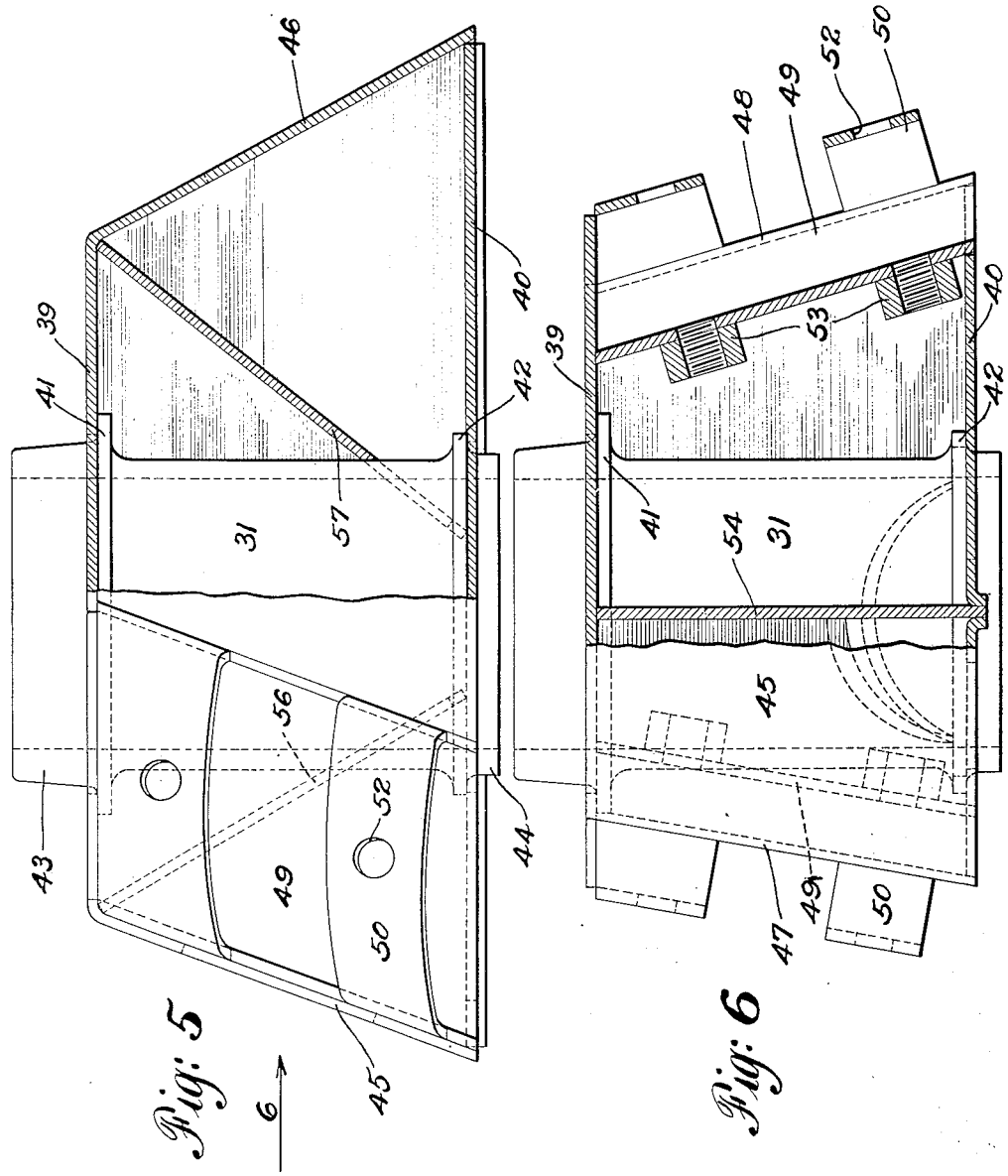
INVENTOR
Agnew E. Larsen
BY
Synnestvedt & Lechner
ATTORNEYS Nov. 27, 1934.  A. E. LARSEN  1,982,113
MOUNTING MEANS FOR AIRCRAFT SUSTAINING ROTORS
Filed April 13, 1931   6 Sheets-Sheet 5
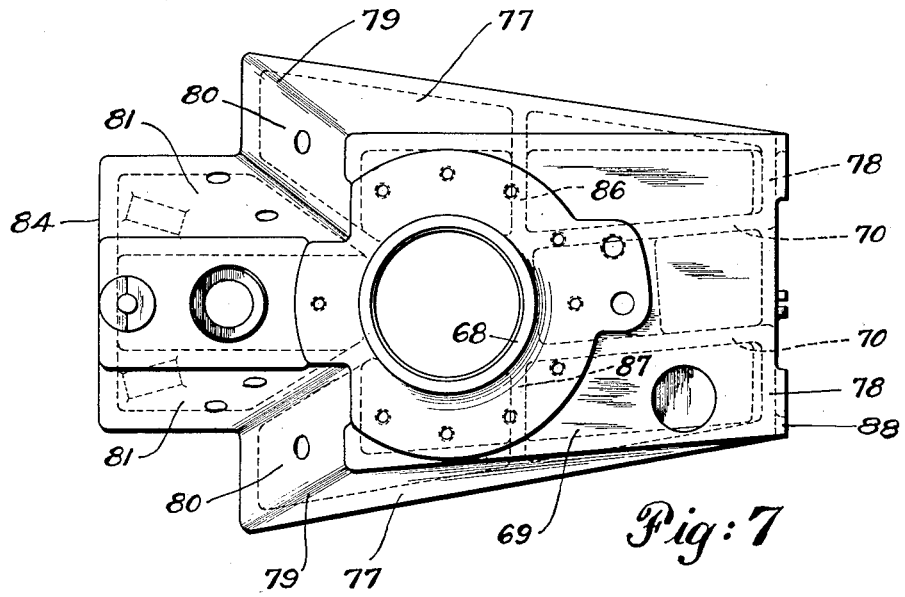
Fig: 7
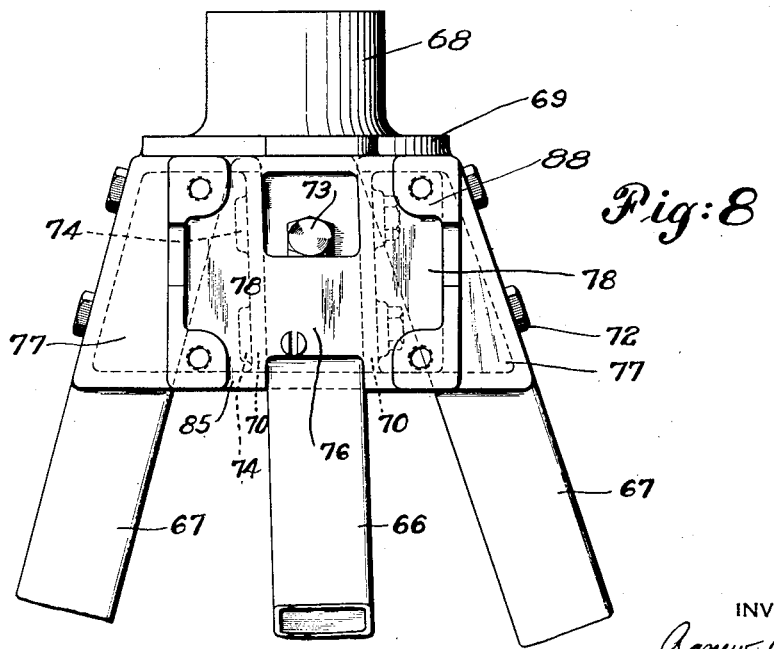
Fig: 8
INVENTOR
Agnew E. Larsen
BY
Synnestvedt & Lechner
ATTORNEYS

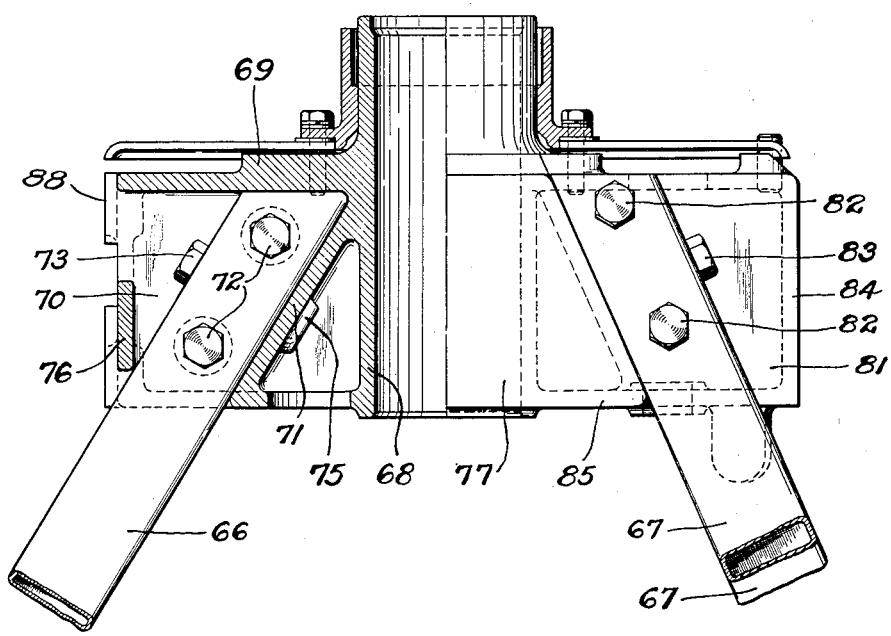
Fig: 9

Patented Nov. 27, 1934

1,982,113

UNITED STATES PATENT OFFICE 1,982,113

MOUNTING MEANS FOR AIRCRAFT SUSTAINING ROTORS

Agnew E. Larsen, Huntingdon Valley, Pa., assignor to Autogiro Company of America, Philadelphia, Pa., a corporation of Delaware Application April 13, 1931, Serial No. 529,576

30 Claims. (Cl. 244—19)

This invention relates to mounting means for aircraft sustaining rotors and particularly to a mounting means for sustaining rotors of the type in which a plurality or set of sustaining blades are mounted for rotation about a common substantially vertically disposed axis. This type of rotor also preferably includes means for permitting the blades to automatically and individually adjust themselves to variations in inertia, lift, drag and anti-drag, and other forces to which they are subjected during the flight operation.

In aircraft of this general type it is desirable that the sustaining rotor should be mounted or disposed a substantial distance above the fuselage or body of the craft in order that the various blades thereof shall not foul on any other part of the ship such, for example, as the propeller or the tail structure. Since the major portion of the lift of such craft is derived from its sustaining rotor, the mounting structure therefor must have considerable strength and rigidity in order adequately to transmit the thrust of sustension to the body of the craft. In addition, such a supporting structure should be very rigid with respect to transverse or lateral forces or thrusts to which the structure may be subjected from time to time as a result, for example, of flying at different altitudes or flying in rough or gusty air.

Additionally, where mechanical rotor starters are employed, the mounting structure is subjected to twisting or torsional strains as a result of starting reaction or force applied between the rotor hub and the mounting structure. Consiaerable torsional rigidity, therefore, is also desirable in a support of this character.

Still further, such rotor mounts or supporting structures should have sufficient strength to adequately resist irregular compression and bending stresses such as occur from the support of the rotor when taxiing on the ground.

The present invention deals particularly with supporting or mounting structures of the character above noted and makes provision for rigid support of the rotor above the fuselage by the use of various members and bracing elements which afford great torsional and horizontal rigidity and strength and which, at the same time, are relatively simple from the standpoint of construction.

In addition, the present invention has in view increasing the efficiency of such structures particularly by reducing to a minimum, parasite drag and the like.

The structure of the present invention also makes provision for ready removal and replacement of sustaining rotors with respect to the supporting mechanism.

The general nature of the invention, as well as other objects and advantages, will be more apparent from a consideration of the following discussion taken with the accompanying drawings which illustrate two embodiments of my improved rotor mounting structure.

Figure 1 is a front elevational view of a mounting structure embodying various features of the present invention, the figure including portions of the rotor itself as well as of the fuselage framing to which the mounting structure is secured;

Figure 2 is an elevational view of various parts illustrated in Figure 1, this figure being taken from the right of the first view;

Figure 3 is a vertical sectional view of an upper portion of the rotor mounting structure of Figures 1 and 2 illustrating, also in vertical section, a rotor axis mechanism together with portions of sustaining blades which are pivoted or articulated thereto;

Figure 4:
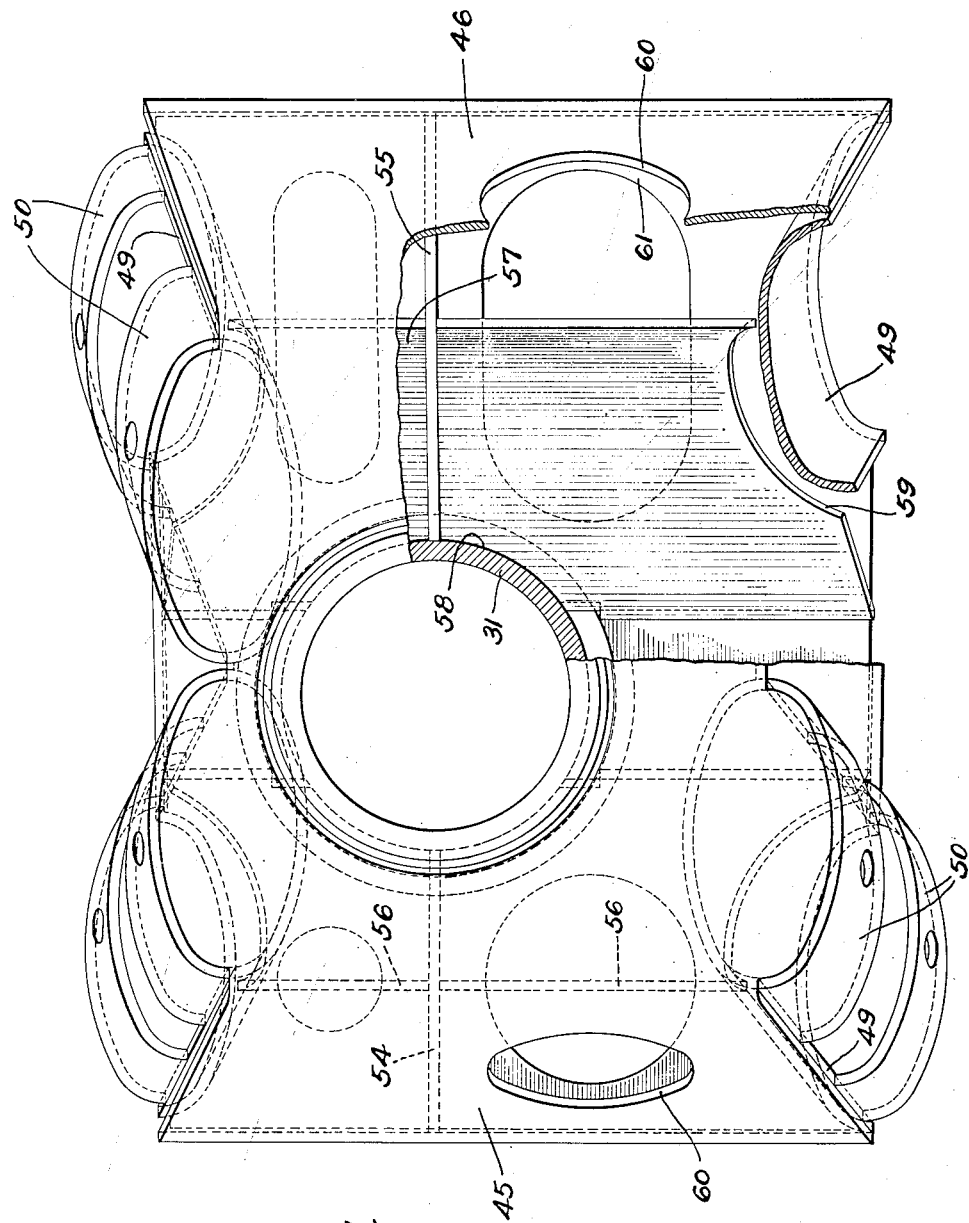

Figures 4, 5, and 6 are enlarged top, side and end views, respectively, of an upper portion of the rotor supporting structure of Figures 1 and 2, each one of these figures having certain parts broken away and shown in section in order to disclose parts which would otherwise be hidden; and Figures 7, 8 and 9 are top, end and side views, respectively, similar to Figures 4, 5 and 6, but illustrating a modified structure.

By reference first to Figures 1 and 2, it will be seen that the supporting structure includes a number of supporting leg members 7, in this instance of hollow stream-lined configuration, which are secured to the upper fuselage longérons 8 by means of clamp devices 9 having ears 10 extended into the hollow ends of the legs 7. The lugs or ears 10, as well as the legs 7, are apertured to receive securing bolts 11.

The fuselage framing, of course, also includes substantially vertically extending bracing elements fragmentarily indicated at 12, as well as transversely disposed braces 13 and it should be noted that in the preferred form the legs 7, which, in effect, form a pyramid or pylon, are secured to the fuselage framing at junction points of transverse as well as vertically extending bracing elements thereof. In this way the sustension thrust, as well as other forces which are transmitted through the pylon legs, are nicely distributed throughout the fuselage framing. It is also of advantage to secure the legs to the fuselage in this manner as the legs, as well as bracing elements of the fuselage and the like, may be secured together in groups, thus eliminating certain clamping or securing devices which would otherwise be employed.

The supporting or pylon leg members, four of which are here shown, converge upwardly to a point which is preferably disposed substantially vertically over a cockpit (not shown) which is provided in the body of the craft. In order to provide additional rigidity and bracing, the legs are interconnected in pairs, those disposed forwardly constituting one pair and those disposed rearwardly constituting the other pair. As best seen in Figure 1, this additional bracing structure includes a substantially horizontally disposed member 14, interconnecting the legs of the pair, at points intermediate the ends thereof, the member 14 being secured to the legs by means of suitable clamps or brackets 15. Tension bracing elements 16 are preferably attached at their lower ends to the bolts 11 by which the legs are secured to the fuselage, suitable apertured clips 17 being provided for this purpose. From this point of attachment of each one of the tension elements or cables 16, the element extends to the juncture of the member 14 and the other leg of the pair, an attaching loop or ear 18 being mounted at this point.

The rotor axis mechanism, indicated in general at 19 in Figures 1 and 2, is mounted at the top of the pylon or supporting legs 7 by means of the device which is illustrated in more detail in Figures 3 to 6 inclusive. Before proceeding with a detailed description of the construction of this pylon leg and axis interconnecting device, reference should be made to Figure 3 in which the rotor axis and hub construction is illustrated in vertical section. In this view the root ends of the blades which are indicated at 20 are connected with pivot joint parts 21, such parts being mounted for articulative movement on the substantially vertically disposed pins 22. Additional pivot pins 23 are disposed substantially horizontally through the pins 22 and cooperate with pairs of ears or lugs 24 which project outwardly from the hub 25 of the rotor axis mechanism.

The hub member 25 is mounted for rotation on the substantially vertically disposed axis element 26, suitable ball bearings 27, 28 and 29 being interposed between these two relatively rotatable parts. The bearings, of course, are of such characteristics as to provide for the transmission of the sustension thrust from the hub element 25 to the inner member 26.

At its lower end the axis structure is extended, as indicated at 30, within a cylindrical sleeve or part 31. The mounting or securing of the lower extension 30 of the axis mechanism within the part 31 includes the disposition of the bushings 32 and 33 therebetween. These bushings, as will be apparent from inspection of Figure 3, are irregularly formed. In the embodiment illustrated, each bushing is provided with inner and outer cylindrical surfaces which have axes extended at an angle to, as well as offset from, each other. In this way a readily adjustable means is provided for inclining or angling the members 30 and 31 with respect to each other. The purpose of this will be noted more fully hereinafter.

In order to rigidly secure the elements 30 and 31 to each other and thus transmit the thrust of sustension from the former to the latter, I have provided a nut device having a portion 34 threaded into the depending axis part 30, and a flanged portion 35 through which the thrust is transmitted to the lower edge of the cylindrical part 31. In this instance the lower bushing 33 has an out-turned lip or shoulder 36 which is interposed between the flange 35 and the part 31. A locking shim or ring 37 may also be disposed between the parts 35 and 36 and deformed or bent into recesses 38 at the periphery of flange 35 in order to positively insure that the nut device will not become loosened during operation.

In Figure 3 I have also illustrated a convenient tachometer drive for the rotor. This drive includes a shaft 62 secured to the cup member 63 which rotates with the hub member 25. At its lower end the shaft 62 is extended through a removable cap 62a (as indicated at 64) which is associated with the securing nut device for the axis mechanism. From this point a suitable flexible tachometer driving cable 65 may be extended to any suitable point in the cockpit of the craft. In the preferred arrangement, a disengageable slip joint 62b is provided in shaft 62 in order to permit separation of the cap 62a and the lower driving parts from the upper portion of shaft 62 and thus facilitate removal of the entire rotor as a unit. Attention is called to the fact that various features of the rotor axis mechanism disclosed in Figure 3 are not a part of the present invention but are described and claimed in the copending application of Juan de la Cierva, Serial No. 496,872, filed November 20th, 1930.

Referring now more particularly to Figures 4 to 6 inclusive, it will be seen that the cylindrical part 31 is mounted for rigid support within a box-like bracing structure. This structure includes an upper wall 39 and a lower wall 40 which are secured, respectively, preferably by welding, to the flanges 41 and 42 formed externally of the part 31. The upper and lower box plates or walls 39 and 40, of course, are suitably apertured to pass the upward and downward extensions 43 and 44 of the sleeve 31.

In addition, this box bracing structure includes front and rear, or end walls 45 and 46 each, preferably, angled to converge upwardly (see Figures 4 and 5, particularly). In the preferred embodiment, these end walls are disposed in planes which intersect at a point lying in a plane through which the axis of the rotor extends. This, of course, is desirable from the standpoint of distribution of stresses and adequate bracing therefor, it being noted that the axis of rotation is the center or source of such stresses.

As seen in Figures 4 and 6, the box structure also includes side walls 47 and 48 which are inclined from the vertical. In this instance, the side walls are inclined to conform to the inclination of the pylon legs 7 which extend upwardly from each side of the fuselage framing. The disposition of these walls in this manner materially facilitates securing of the tubular legs 7 to the box structure and in order to provide a rigid or firm attachment thereof, the side walls 47 and 48 are also recessed or provided with seats 49 in their outer surfaces which are curved to conform to the stream-lined configuration of the legs 7.

Each leg 7, therefore, extends upwardly from the body or fuselage and is received in a seat formed substantially at a corner of the box structure. In this way a rigid apex or tip is provided for the supporting pylon. The upper ends of the pylon legs are secured in their respective seats by means of brackets 50, preferably welded to the side walls of the box as well as to the legs themselves, thus forming, in effect, leg sockets of the full height of the apex box. If desired, the legs may be additionally secured to the apex box by means of bolts 51 (see Figure 1) extending through suitable apertures 52 (see Figures 5 and 6, particularly) in the brackets or socket members 50. For convenience in assembling the parts, threaded or nut members 53 (see Figure 6) may be secured, as by welding, to the inner face of each one of the leg seats 49. The angled or triangulated pylon structure, therefore, is provided with a rigid apex interbracing device, all of which parts when assembled, afford great strength and thus adequately care for the lift thrust as well as any transverse or horizontal strains to which the assembly may be subjected.

The apex box structure itself also includes internally disposed and triangulated bracing elements in order to afford still further strength. As seen most clearly in Figures 4 and 6, substantially vertically disposed bracing elements or plates 54 and 55 are disposed fore and aft of the axis mounting part 31. Additionally, inclined bracing plates 56 and 57 are arranged to the front and rear of the cylindrical member 31, there being a plate 56 at each side of the vertical element 54 and also a plate 57 at each side of the brace 55. As appears most clearly in Figures 4 and 5, these inclined or angled plates 56 and 57 are disposed in planes which intersect at a point lying in a plane containing the axis of rotation. Here again, therefore, an angular or triangulated bracing structure is provided. The plates 56 and 57, furthermore, are recessed or cut out, as illustrated for example at 58 and 59 in Figure 4, in order to engage the sleeve 31 and the inner surfaces of the leg seats 49.

All of the various walls and bracing elements of this apex box may be fabricated from sheet metal and are preferably welded together at their various points of contact or interengagement. The bracing plates, in the preferred arrangement, are also secured to the axis sleeve 31 by suitable welding. In order to facilitate welding during fabrication, as well as to provide for a minimum total weight of the structure, various side and bottom walls may be apertured as indicated, for example, at 60 and 61.

It will be observed that the axis of the rotor is mounted in the apex box angled and offset both longitudinally and laterally with respect to the center of the pylon apex, the angling and offsetting being oppositely arranged. Various characteristics of the operation of rotors of this type have been found to make it desirable to so dispose the rotor axis, but these characteristics need not be considered in detail herein for an understanding of the present invention, it being noted that the angular offset of the rotor axis in this manner, is not a part of the present invention per se, but is fully described and claimed in the copending application of Juan de la Cierva, Serial No. 546,680, filed June 25th, 1931.

The present invention, however, provides a conveniently adjustable structure by which the fixed inclination of the rotor axis may be variously set. It will be apparent from inspection of Figure 3 again, that with irregularly formed bushings interposed between the parts 30 and 31, adjustments of inclination may be made by substituting pairs of bushings of different irregular configurations. That is, when various characteristics of the craft as a whole make it desirable to incline the rotor axis forwardly or rearwardly or laterally from the position shown in Figure 3, the only adjustment necessary involves a replacement of the bushings with others having inner and outer surfaces whose axes are somewhat differently offset and angled with respect to each other.

The structure of Figure 3, including the single nut device for securing the parts 30 and 31 to each other, is advantageous as it provides for quick and ready detachment of the entire rotor as a unit in order, for example, to make adjustments of various kinds or to replace, lubricate or repair any rotor parts. This removal and replacement, it will also be noted, does not require separation of the rotor hub and spindle parts or, indeed, of the bearings disposed therebetween or of any other members immediately associated with the rotor. At the same time, with the various securing devices properly fabricated, a very rigid interconnection is provided between the rotor axis mechanism and its support, it being apparent that the use of a nut device threaded into the lower extension 30 and having a flange engaging the part 31 provides a very strong interconnection through which the lift is transmitted.

In Figures 7, 8 and 9 I have illustrated a modified pylon apex structure which is particularly adapted for use in association with a "tripod pylon" such as described and claimed in the copending application of Juan de la Cierva, Serial No. 497,745, filed November 24th, 1930. In Figures 8 and 9 the three legs 66, 67—67 of this tripod pylon are illustrated as converging upwardly in a manner similar to the four-leg structure of Figures 1 and 2. It might be noted, however, that, according to this arrangement, the leg 66 extends upwardly from the body of the craft substantially intermediate the edges or sides thereof while the legs 67 preferably have their lower ends disposed adjacent the upper fuselage longérons. This structure, similarly to that of Figures 1 to 6 inclusive, provides for triangulated interbracing of the rotor axis mechanism and the pylon legs.

This embodiment, furthermore, is arranged in such manner as to provide for the integral casting of the various bracing elements of the apex box. The casting preferably includes a cylindrical portion 68 adapted to receive the axis mechanism in a manner similar to that described above in connection with the socket or sleeve 31 (see Fig. 3). Intermediate the ends of the socket 68 an outwardly projecting wall 69 is formed below which the pylon leg receiving sockets are provided. As here shown, the end portions of the pylon legs as well as their sockets in the apex box are angular, although it should be understood that the sockets may be curved to conform to legs of circular or streamline configuration.

As best seen in Figures 8 and 9 the single pylon leg 66 is received in a socket formed between a pair of substantially vertically extended partitions or walls 70 and a diagonally extending wall 71, the latter being joined to the casting substantially at the junction of the parts 68 and 69. The leg receiving socket formed in this manner is preferably squared to conform to the squared configuration of the associated pylon leg. Upon insertion of the pylon leg into its socket it may be secured in position as by welding or as illustrated in Figures 8 and 9, by means of bolts 72 and 73. The bolts 72 extend through the upright walls 70 as well as the leg 66 and take into threaded bosses such as indicated at 74 in Figure 8. On the other hand the bolt 73 preferably is arranged to extend through the leg 66 at right angles to the extension of the bolts 72, this bolt also being provided with a threaded boss 75 at the underside of the wall 71.

As appears in Figures 7 and 9 the upright walls 70 are extended outwardly beyond the leg 66, at least at the upper termination thereof. At their outer edges these walls are interconnected by means of a transversely extended bracing element or strap 76.

By reference particularly to Figures 7 and 8 it will be seen that this apex box also includes inclined side walls 77 disposed outwardly beyond the partitions 70 and joined therewith by means of the vertically disposed elements 78. These elements 78, together with the strap 76, in effect, constitute an end wall of the box which is apertured to provide access to the bolt 73 (see Fig 8). The side walls 77, as will be apparent from inspection of the drawings, diverge from the vertical elements 78 to the points indicated at 79. This divergence, of course, is in addition to their inclination with respect to the vertical so that considered together with various other parts, the structure is somewhat similar to a truncated pyramid.

Seats or sockets for the pylon legs 67 are formed, in part, by surfaces 80 which join the walls 77 at the points 79 and extend inwardly therefrom toward each other. These surfaces 80 as will be seen from inspection of Figure 9 are angled substantially oppositely with respect to the diagonal wall 71, the inclination being similar to that of the legs 67. At their inner edges the surfaces 80 merge with additionally angled or downwardly diverging surfaces 81, the legs 67 being seated in the recesses or pockets formed between the surfaces 80 and 81 at either side of the structure. Here, again, the legs may be secured to the apex box as by means of welding or as illustrated most clearly in Figure 9 by means of bolts 82 and 83. These bolts are also preferably arranged to take into suitably arranged and threaded bosses provided at the inside of the elements 80 and 81.

At their outer edges the members 81 are joined together by means of an end wall 84. The various side walls of this box structure are interconnected at their lower edges by means of a bottom plate 85 it being understood, of course, that this bottom plate meets but does not extend beyond the lower edges of the various side walls. Additionally, this bottom plate as well as certain other partitions of the structure may be apertured in order to facilitate casting and also reduce the weight.

In addition to the foregoing this apex structure is preferably provided with internally disposed bracing elements or plates 86 and 87 which, as seen in Figure 7, may advantageously be extended from the axis socket 68 adjacent the junction thereof with the wall members 70.

From the foregoing it will be apparent that the various external as well as internal walls and supporting or bracing parts of which this box is composed provide for triangulated bracing as against a wide variety of different stresses or strains to which the structure may be subjected. It is also observed that at least certain pairs of the inclined side walls, for example, those which engage the pylon legs 67, lie in planes which intersect in or at least adjacent to a plane containing the axis of the rotor. This structure, therefore, also provides for distribution of operating stress in a manner similar to that referred to above in connection with the structure of Figures 1 to 6 inclusive, it being noted however, that in this instance, the triangulated bracing is adapted to a construction in which three instead of four supporting legs are employed.

In conclusion, it should be noted that the use of the apparatus of Figures 1 to 6 results in very rigid support of the sustaining rotor of an aircraft while employing various parts which may readily be fabricated from sheet metal and tubing. Particular attention is also called to the fact that great strength is afforded by the angular pylon apex box as well as by the triangulated bracing elements disposed therein. On the other hand, in Figures 7, 8 and 9 I have illustrated a structure embodying triangulated bracing in a cast apex box. A structure of this character may be found to be more desirable than that of Figures 1 to 6, at least in certain instances.

In this connection it might be pointed out that where mechanical starting mechanism is associated with the rotor, convenient mounting for starter parts is provided for by this relatively stout apex structure. For this purpose, lugs 88 may be formed adjacent the end wall 78.

Finally, it is pointed out that the great rigidity of the cellular structures of the present invention is highly advantageous in a rotor construction which is provided with a mechanical starter. Such starters, for example as described and claimed in the copending application of Joseph S. Pecker, Serial No. 512,383, filed January 30, 1931, operate to initiate rotation of the rotor by means of gear parts mounted on the rotor hub and the supporting pylon structure, thus producing a torsional reaction between these parts which is adequately provided for.

I claim:—

1. In an aircraft having rotatable sustaining means mounted above the body thereof, a mounting structure for the sustaining means including a plurality of leg members extended upwardly from the body, an axis mechanism, and a device for interconnecting the leg members and the axis mechanism including triangulated bracing elements at least some of which extend in planes which intersect substantially in a plane containing the axis of said mechanism.

2. In an aircraft having rotatable sustaining means mounted above the body thereof, a mounting structure for the sustaining means including a plurality of leg members supported on the craft and converging upwardly therefrom, and an angular leg interconnecting box structure having side walls converging upwardly at an angle similar to that of leg convergence, said side walls having seats formed thereon for engaging the leg members.

3. In an aircraft having rotatable sustaining means mounted above the body thereof, a mounting structure for the sustaining means including a plurality of leg members supported on the craft and converging upwardly therefrom, and an angular leg interconnecting box structure having side walls converging upwardly at an angle similar to that of leg convergence, the leg members being secured to said side walls, and said box structure including other wall elements angled to converge toward each other.

4. In an aircraft having rotatable sustaining means mounted above the body thereof, a mounting structure for the sustaining means including a plurality of leg members supported on the craft and converging upwardly therefrom, and an angular leg interconnecting box structure having side walls converging upwardly at an angle similar to that of leg convergence, the leg members being secured to said side walls, and said box structure including triangulated bracing elements.

5. In an aircraft having rotatable sustaining means mounted above the body thereof, a mounting structure for the sustaining means including a plurality of leg members supported on the craft and converging upwardly therefrom, an axis mechanism, and an angular box structure for interconnecting the leg members and said mechanism, said box structure including side walls converging upwardly at an angle similar to that of leg convergence, together with means for securing the leg members to said side walls and means for securing said mechanism to the box structure.

6. In an aircraft having rotatable sustaining means mounted above the body thereof, a mounting structure for the sustaining means including a plurality of leg members supported on the craft and converging upwardly therefrom, an axis mechanism, and an angular box structure for interconnecting the leg members and said mechanism, said box structure including side walls converging upwardly at an angle similar to that of leg convergence, together with means for securing the leg members to said side walls and means for securing said mechanism to the box structure, the said box structure also including internal bracing elements disposed to distribute sustension thrust from said mechanism through the box structure to the leg members.

7. In an aircraft having rotatable sustaining means mounted above the body thereof, a mounting structure for the sustaining means including leg members extended upwardly from the craft, an axis mechanism, and a box structure for interconnecting the leg members and said mechanism, said box structure including top, bottom and side walls and angular bracing elements therein.

8. In an aircraft having rotatable sustaining means mounted above the body thereof, a mounting structure for the sustaining means including leg members extended upwardly from the craft, an axis mechanism, and a box structure for interconnecting the leg members and said mechanism, said box structure including top, bottom and side walls and angular bracing elements welded therein, at least one of said walls being apertured for access to the box interior.

9. In combination, a sustaining rotor, an axis structure therefor including concentric sleeves and interposed bearing devices, a mount for the axis structure, said structure positioning the rotor for rotation above said mount, and securing means interconnecting the axis structure and the mount, said means being detachable whereby the rotor and the axis structure may be lifted up as a unit off the mount.

10. In combination, a sustaining rotor, an axis structure therefor including concentric sleeves and interposed bearing devices, a mount for the axis structure, said structure positioning the rotor for rotation above said mount, and securing means interconnecting the axis structure and the mount, said means being detachable whereby the rotor and the axis structure may be lifted up as a unit off the mount, said means being removable from below the mount without disturbing the latter.

11. In an aircraft having rotatable sustaining means, a mounting structure for the sustaining means including an axis mechanism, a fixed support adapted to engage said mechanism, and a single readily removable securing device interconnecting the support and said mechanism, said device including a part in threaded engagement with said mechanism and a flange abutting against the support.

12. In an aircraft having rotatable sustaining means, a mounting structure for the sustaining means including an axis mechanism having a portion of circular cross section, a fixed supporting device having a cylindrical part adapted to receive said portion, and means for transmitting thrust of sustension from said axis mechanism to said device, the last mentioned means including a nut device in threaded engagement with said mechanism and having an abutment engaging said supporting device.

13. In an aircraft having rotatable sustaining means, a mounting structure for the sustaining means including a base or pylon, an axis mechanism for the sustaining means, a fixed supporting socket for said mechanism, mounted on said pylon, and a part cooperating with said socket and angularly bored to receive said mechanism whereby to provide a relative inclined or angled disposition of the rotor axis with respect to said supporting socket.

14. In an aircraft having rotatable sustaining means, a mounting structure for the sustaining means including an axis mechanism having a part substantially circular in cross section, a fixed supporting device having an aperture adapted to receive said part, and a bushing interposed between said part and said device, the external and internal surfaces of said bushing being formed with relatively angled axes.

15. In combination, an axis mechanism for a sustaining rotor, a supporting device for the axis mechanism including a cylindrical part adapted to receive a portion of said mechanism, the said mechanism having a portion of circular cross section extended into said cylindrical part, and a pair of spaced bushings interposed between said part and said portion, the inner and outer surfaces of said bushings having axes which are angled with respect to each other.

16. In an aircraft, a sustaining rotor, an axis structure for the rotor, and a supporting mechanism for the rotor including a plurality of structural elements extended upwardly to support said rotor generally above the body of the craft, there being at least two such structural elements angled with respect to each other, and a hollow box-like device to which said axis mechanism is secured, said device having at least two side walls angled with respect to each other in a manner similar to the angularity of said elements, said elements being secured to said side walls.

17. In an aircraft, a sustaining rotor, an axis structure, and a mechanism for supporting the rotor above the body of the craft, said mechanism including a plurality of structural members extended upwardly to support the rotor generally above the body of the craft, at least two of said members being angled with respect to each other and being provided with rounded portions, a device for interbracing said leg elements and the axis structure including a generally upright plate-like element secured to the axis structure and having a rounded recess or seat formed at one side thereof to receive a rounded portion of one of said members, and means for securing the member last mentioned in its seat at one side of said plate-like element.

18. In an aircraft, a sustaining rotor, an axis structure, and a mechanism for supporting the rotor above the body of the craft, said mechanism including a plurality of structural members extended upwardly to support the rotor generally above the body of the craft, at least two of said members being angled with respect to each other and being provided with rounded portions, a device for interbracing said leg elements and the axis structure including a plate-like element secured to the axis structure and lying in a plane angled with respect to the rotor axis similarly to the angularity of said member and having a rounded recess or seat formed at one side thereof to receive a rounded portion of one of said members, and means for securing the member last mentioned in its seat at one side of said plate-like element.

19. In an aircraft, a sustaining rotor, an axis member for the rotor, a plurality of upwardly extended structural elements adapted to support the rotor generally above the body of the craft, and a mechanism for distributing the thrust of sustension from said axis member to said elements, said mechanism including a substantially cylindrical socket member adapted to receive said axis member and generally flat web or plate-like elements secured to said socket externally thereof and extended from different sides thereof to be secured to the upper ends of the several structural elements.

20. In an aircraft, a sustaining rotor, an axis member for the rotor, a plurality of upwardly extended structural elements adapted to support the rotor generally above the body of the craft, and a mechanism for distributing the thrust of sustension from said axis member to said elements, said mechanism including a box structure having angularly arranged side wall portions and having vertically spaced generally horizontal wall portions, and a substantially cylindrical axis-receiving socket secured in said box between said vertically spaced wall portions, said axis member being arranged to be secured in said socket and said structural elements being secured to said angular wall portions, whereby the thrust of sustension is effectively distributed from said axis member through the socket and the several wall portions of the box structure to said structural elements.

21. In an aircraft sustaining rotor mount, the combination of an angular and substantially closed cellular box fabricated from sheet metal, a substantially cylindrical axis-receiving socket mounted in the box, a rotor axis member insertable in and removable from said socket, and pylon or structural post elements connected to the box and interbraced with respect to each other and with respect to the socket thereby, whereby to provide effective distribution of the thrust of sustension from the axis-receiving socket to the several post elements.

22. In an aircraft, a sustaining bladed rotor, a normally fixed axis member about which the blades of the rotor are mounted to rotate, and a mechanism for supporting the rotor generally above the body of the craft, said mechanism including a plurality of structural members extended upwardly, a socket adapted to receive said axis member, a bracing structure interconnecting said elements and said socket and means for transmitting the thrust of sustension from said member to said structure including a readily removable nut device cooperating with the lower end of said member below a part of said bracing structure, whereby the rotor including axis parts thereof may be removed from the mounting structure as a unit upon removal of said nut device.

23. In an aircraft, a sustaining bladed rotor, a normally fixed axis member about which the rotor blades are mounted to rotate, a mounting structure for the rotor including a generally upright socket adapted to receive the axis member, and an asymmetrically formed part interposed between said member and said socket and constructed to position the rotor axis at an angle to the axis of the generally upright socket.

24. In an aircraft sustaining rotor mount, the combination of an angular and substantially closed cellular box, a substantially cylindrical axis-receiving socket mounted in the box, a rotor axis member insertable in and removable from said socket, and means in said socket for altering the position of the axis of said member with respect to the axis of said socket.

25. In an aircraft, a sustaining rotor, and a mounting structure for the rotor including an angular and substantially closed cellular box disposed and supported above the primary body structure of the craft, a substantially cylindrical axis-receiving socket mounted in the box and a rotor axis member insertable in and removable from said socket.

26. In an aircraft, a sustaining rotor, and a mounting structure for the rotor including an angular and substantially closed cellular box disposed and supported above the primary body structure of the craft, a substantially cylindrical axis-receiving socket mounted in the box and a rotor axis member insertable in and removable from said socket, together with leg or post elements extended upwardly from the main body structure of the craft to support said box above the body, said elements being connected to and interbraced by said box.

27. In an aircraft having a sustaining rotor, a rotor support, a spindle member associated with said support and having an abutment thereon adapted to contact with the support, and means for securing said spindle to the support by reaction against said abutment, said spindle member being extended upwardly from the support to provide an axis about which the rotor is mounted for rotation.

28. In an aircraft having a sustaining rotor, a rotor spindle member having an abutment intermediate its ends, a spindle support associated therewith at one side of said abutment, a rotor bearing associated with said spindle at the other side of said abutment, and means arranged toward the ends of said spindle for retaining the support and said bearing in their proper positions with respect to said abutment.

29. In an aircraft having a sustaining rotor, a rotor support, a spindle member associated with said support and having an abutment thereon intermediate its ends adapted to contact with said support, a nut device associated with the spindle and arranged to tighten the support against said abutment, and a rotor hub mounted for rotation about said spindle and having a bearing positioned, at least in part, by the spindle abutment.

30. In an aircraft having a sustaining rotor, a rotor support, a spindle member associated with said support and having a part extended upwardly above the support to provide an axis about which the rotor is mounted for rotation, and means for securing said spindle to the support including interengaging flange-like abutment means on the spindle and support serving as a means for relatively positioning the spindle and support.

AGNEW E. LARSEN.